United States Patent
Hikita et al.

(10) Patent No.: US 7,735,702 B2
(45) Date of Patent: Jun. 15, 2010

(54) WEB GUIDING ROLLER AND WEB CONVEYING APPARATUS

(75) Inventors: Shinji Hikita, Kanagawa (JP); Masayuki Kawarada, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 188 days.

(21) Appl. No.: 11/862,945

(22) Filed: Sep. 27, 2007

(65) Prior Publication Data
US 2008/0073402 A1    Mar. 27, 2008

(30) Foreign Application Priority Data
Sep. 27, 2006    (JP)    .............................. 2006-263103

(51) Int. Cl.
B65H 27/00    (2006.01)
B65H 23/04    (2006.01)

(52) U.S. Cl. .................... 226/193; 226/196.1; 226/190; 242/615.4

(58) Field of Classification Search .............. 226/196.1, 226/182, 189, 190, 193; 242/615.4
See application file for complete search history.

(56) References Cited

U.S. PATENT DOCUMENTS

| | | | | |
|---|---|---|---|---|
| 4,720,714 A | * | 1/1988 | Yukio | .......................... 346/134 |
| 5,593,140 A | * | 1/1997 | van Beers | .................... 254/374 |
| 5,819,835 A | * | 10/1998 | Broome | ...................... 160/243 |
| 6,058,844 A | * | 5/2000 | Niemiec | ...................... 101/488 |
| 6,427,941 B1 | * | 8/2002 | Hikita | .................... 242/615.12 |
| 6,635,111 B1 | * | 10/2003 | Holtmann et al. | ........... 118/325 |

FOREIGN PATENT DOCUMENTS

| | | |
|---|---|---|
| JP | 08175727 A | 7/1996 |
| JP | 10077146 A | 3/1998 |
| JP | 2003146505 A | 5/2003 |

* cited by examiner

*Primary Examiner*—Evan H Langdon
(74) *Attorney, Agent, or Firm*—Sughrue Mion, PLLC (57) ABSTRACT

A web conveying apparatus is provided with a plurality of web guiding rollers. The web guiding rollers convey a web on which a functional material has just been coated in a coating section. Concave portions and convex portions that have a substantially semicircular cross section are alternately formed on a peripheral surface along a circumferential direction of each roller. A pitch $P_v$ of the concave portions and a pitch $P_m$ of the convex portions are in the range of 0.01 mm or more and 2 mm or less. A height $H_{v-m}$ from a lowest point of the concave portion to a highest point of the convex portion is in the range of 0.01 mm or more and 1 mm or less. A curvature radius $R_v$ of the concave portion and a curvature radius $R_m$ of the convex portion are in the range of 0.1 mm or more and 0.5 mm or less.

8 Claims, 4 Drawing Sheets

WEB GUIDING ROLLER AND WEB CONVEYING APPARATUS

FIELD OF THE INVENTION

The present invention relates to a roller for guiding running of a web, and also relates to a web conveying apparatus including a plurality of these web guiding rollers.

BACKGROUND OF THE INVENTION

In an apparatus for producing a magnetic tape, photographic film, optical functional film or the like, a web is continuously fed from a whole roll. While the web is being fed out, a functional material such as a magnetic material, photosensitive material, optical functional material or the like is coated onto one surface of the web. The web is then dried and wound into a roll form again. Such a producing apparatus is provided with a plurality of rollers for guiding the running web along a predetermined passage.

A device that uses the magnetic tape, photographic film, optical functional film or the like has recently been miniaturized. Along with this trend, the web of these materials is desired to be thinned and smoothed. When the web is thinned and smoothed, however, the rollers slip with respect to the web while conveying the web, and the web may have scratches, wrinkles and the like. In addition, when the web just after being coated with the functional material is conveyed, roller marks may remain on the coated surface, which decreases the yield.

In order to solve these problems, rollers having a peripheral face provided with a spirally extending groove and an upheaval part for conveying a thin web whose thickness is not more than 25 μm are proposed (see Japanese Patent Laid-open Publications No. 8-175727 and 10-77146). In addition, a web guide roller having fine recessed parts is also proposed. An average depth of the recessed parts is 5 μm or more and 50 μm or less, and an occupation area rate of flat parts besides the recessed parts is 50% or more and 70% or less (see Japanese Patent Laid-open Publication No. 2003-146505).

The rollers disclosed in the Japanese Patent Laid-open Publications No. 8-175727 and 10-77146 convey the web having the thickness of not more than 25 μm and on which no functional material is coated. Therefore, the publications do not consider the occurrence of the roller marks which may be generated just after the coating of the functional material on the web.

The web guide roller disclosed in the Japanese Patent Laid-open Publication No. 2003-146505 has the recessed parts formed on the peripheral face thereof by blasting. In the blasting, fine particles, such as aluminasol or glass beads, are blasted toward the roller, therefore the recessed parts may be dispersed randomly. Moreover, the fine particles have variation in size, therefore the depths of the recessed parts are not uniform. Furthermore, the roller cannot maintain the frictional force when the web conveying speed becomes high, and the roller may slip with respect to the web.

During the so-called film production, in which a film is produced from a polymer, the rollers slip with respect to the film while conveying the film, like the rollers slip with respect to the web during the coating process, and the film may have scratches, wrinkles and the like. In the film production according to the solution casting method, a film containing a solvent, a hot film being heated, or the like is conveyed. In the film production according to the melt extrusion method, a film having a temperature as high as approximately a melting point thereof, or the like is conveyed. During the film convey-ance, the film itself may have roller marks. Note that the roller marks generated on the film itself during the film production is also referred to as "roller marks" in the following descriptions.

SUMMARY OF THE INVENTION

A primary object of the present invention is to provide a web guiding roller that prevents occurrence of scratches, wrinkles and roller marks on a web.

Another object of the present invention is to provide a web conveying apparatus that reduces the production cost.

In order to achieve the above and other objects, a roller of the present invention for guiding running of a web while supporting the web on a peripheral surface of the roller, includes concave portions and convex portions alternately formed on the peripheral surface along a circumferential direction of the roller. The concave portions and the convex portions are formed into a substantially semicircular cross section. A pitch between the concave portions and a pitch between the convex portions are in the range of 0.01 mm or more and 2 mm or less, and a height from a lowest point of the concave portion to a highest point of the convex portion is in the range of 0.01 mm or more and 1 mm or less.

A curvature radius of the concave portion and a curvature radius of the convex portion are preferably in the range of 0.1 mm or more and 0.5 mm or less.

A flat surface parallel to an axial direction of the roller is preferably formed at each highest point of the convex portion. At this time, the flat surface preferably has a width of 0.05 mm or more and 0.5 mm or less in the axial direction.

The layer is preferably at least one of a magnetic coating layer formed for a magnetic tape and the like, a photosensitive coating layer formed for a photographic film and the like, and an optical functional coating layer formed for an optical functional film or the like.

The web that is guided by the roller preferably has a thickness of 20 μm or more and 200 μm or less.

A web conveying apparatus of the present invention includes a plurality of the above-described web guiding rollers. The web guiding rollers are disposed along a web conveying passage in the web conveying apparatus.

The web guiding roller is preferably driven and rotated by a motor.

According to the web guiding roller of the present invention, the concave portions and convex portions that have a substantially semicircular cross section are formed alternately on the peripheral surface along the circumferential direction of the roller, the pitch between the concave portions and the pitch between the convex portions are 0.01 mm or more and 2 mm or less, and the height from the lowest point of the concave portion to the highest point of the convex portion is 0.01 mm or more and 1 mm or less. Owing to this, the roller does not slip with respect to the web, and thereby preventing the occurrence of scratches, wrinkles and roller marks on the web.

In addition, since the web conveying apparatus of the present invention includes a plurality of the above-described web guiding rollers, the occurrence of scratches, wrinkles and roller marks on the web is prevented, and thereby improving the yield, which results in reducing the production cost.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
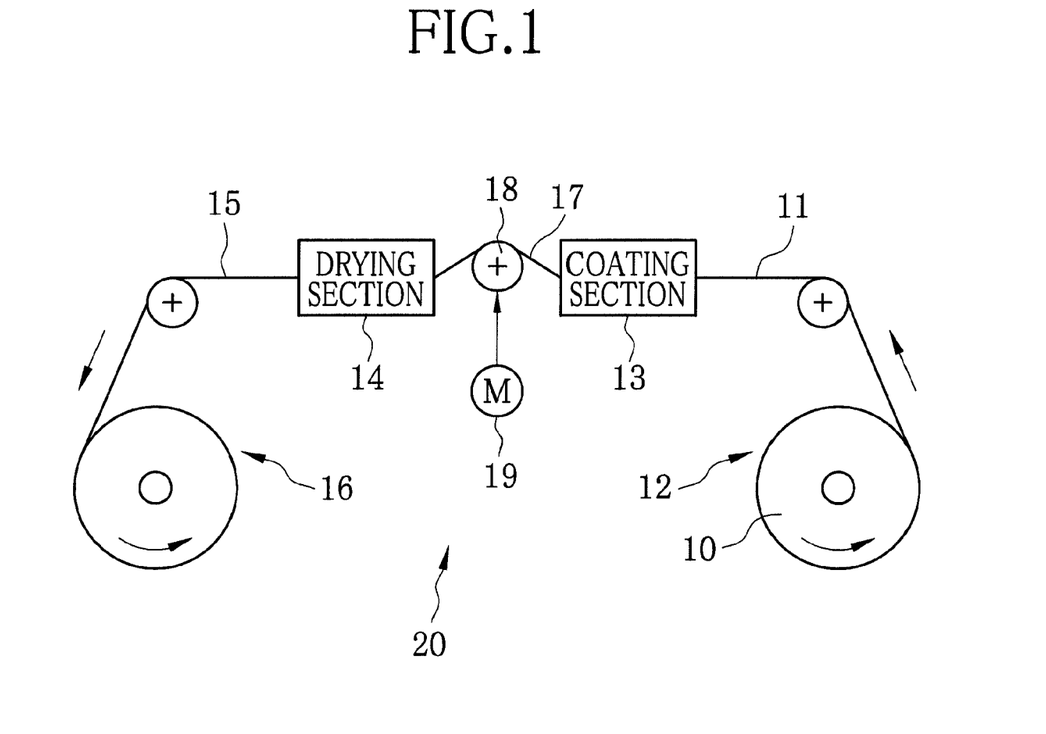
FIG. 1 is a schematic view illustrating a web conveying apparatus of the present invention.

In FIG. 1, a web conveying apparatus 20 of the present invention is provided with a feeding section 12 for continuously feeding a web 11 from a roll (hereinafter, referred to as web roll) 10, a coating section 13 for coating a functional material on a surface of the web 11 to form a magnetic coating layer, photosensitive coating layer, optical functional coating layer or the like onto the web 11, a drying section 14 for drying the coated surface of the web 11, and a winding section 16 for winding up the web 11 having the coating layer formed thereon into a roll form again. Hereinafter, the web 11 on which the coating layer is formed and dried in the drying section 14 is referred to as a film 15.

The web 11 is a flexible support having a width of 100 mm or more and 3000 mm or less, a length of 100 m or more and 5000 m or less, a thickness of 20 μm or more and 200 μm or less, a surface roughness Ra of 1 nm or more and 100 nm or less. A material of the web 11 may be, for example, a plastic film such as polyethylene terephthalate, polyethylene-2,6-naphthalate, cellulose diacetate, cellulose triacetate, cellulose acetate propionate, polyvinyl chloride, polyvinylidene chloride, polycarbonate, polyimide, polyamide and the like; a paper; a paper on which α-polyolefin group whose carbon number is 2 to 10 such as polyethylene, polypropylene, ethylene butene polymer and the like is coated or laminated; a metal foil such as aluminum, copper, tin and the like.

A plurality of web guiding rollers 18 is provided between the coating section 13 and the drying section 14. Although only one web guiding roller 18 is illustrated in FIG. 1 for the sake of simplifying the drawing, the web conveying apparatus 20 of the present invention is practically provided with plural web guiding rollers 18. The web guiding rollers 18 convey the web 11 just after the formation of the coating layer thereon in the coating section 13. Hereinafter, the web 11 at this state, that is, just after the formation of the coating layer thereon is referred to as a wet film 17. The web guiding roller 18 is driven by a motor 19 to rotate at the speed same as the conveying speed of the wet film 17.

Figure 2:
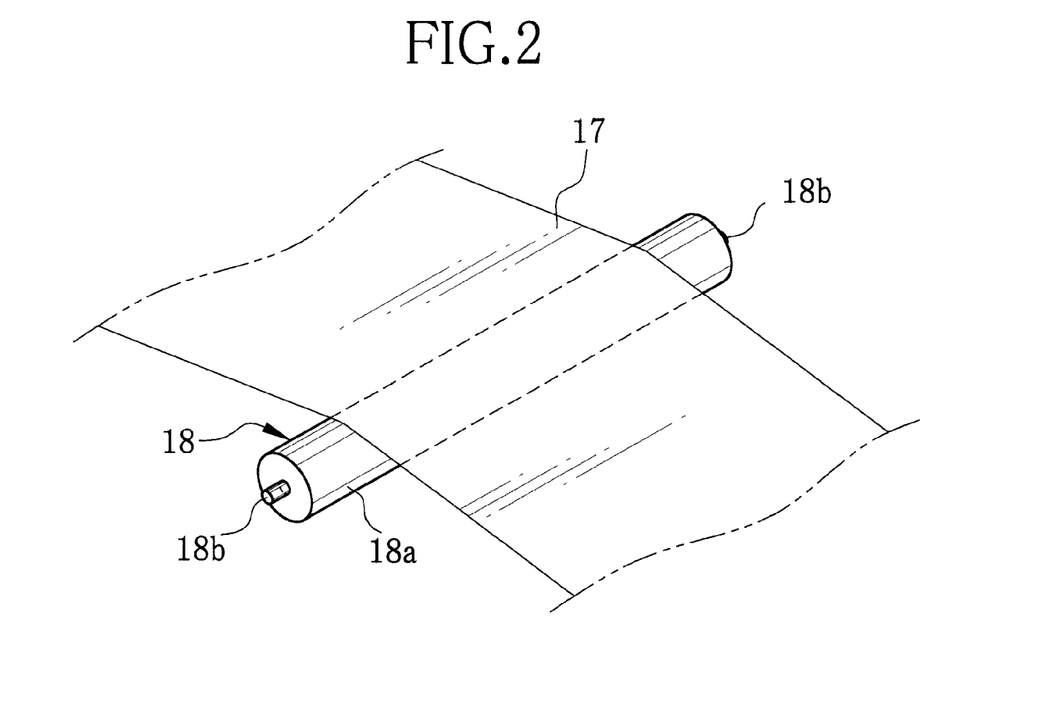
FIG. 2 is a perspective view illustrating a structure of a web guiding roller.

As shown in FIG. 2, each of the web guiding rollers 18 is constituted from a roller body 18a and shafts 18b fixedly inserted into opposite ends of the roller body 18a. The roller body 18a conveys the wet film 17 while supporting the wet film 17 with a peripheral surface thereof. Materials for the roller body 18a and the shafts 18b are, for example, aluminum, iron, stainless steal, carbon fiber reinforced plastic (CFRP) and the like having corrosion resistance.

Figure 3:
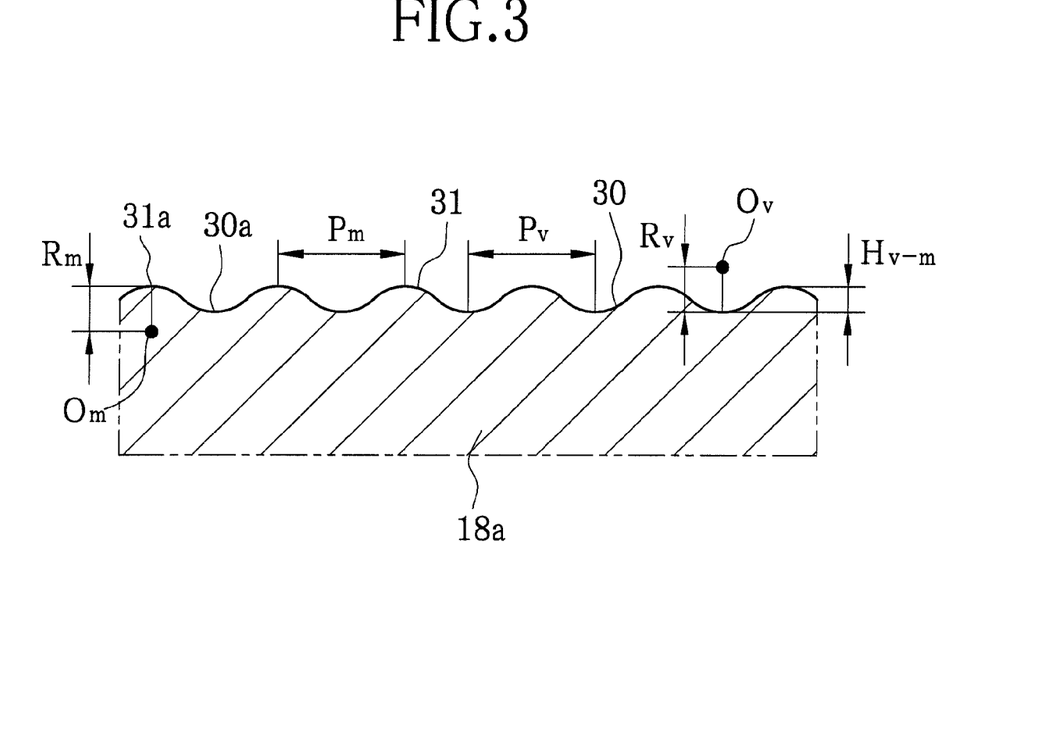
FIG. 3 is an enlarged partial section view illustrating a surface shape of the web guiding roller.

As shown in FIG. 3, concave portions 30 and convex portions 31 are formed on the peripheral surface along a circumferential direction of the roller body 18a. The concave portions 30 and the convex portions 31 each has a substantially semicircular cross section. The concave portions 30 and the convex portions 31 are disposed alternately in an axial direction of the roller body 18a. The concave portions 30 and the convex portions 31 are accurately processed and formed by a precision lathe with use of a cutting tool.

A pitch $P_v$ of the concave portions 30, which is the distance between lowest points 30a of the adjacent two concave portions 30, and a pitch $P_m$ of the convex portions 31, which is the distance between highest points 31a of the adjacent two convex portions 31 are in the range of 0.01 mm or more and 2 mm or less. When the pitches $P_v$ and $P_m$ are less than 0.01 mm, the lathing processing becomes difficult, and the production cost becomes extremely high even if the lathing is performed. When the pitches $P_v$ and $P_m$ are more than 2 mm, on the other hand, the web guiding roller 18 may slip with respect to the wet film 17, or the roller marks may remain on the wet film 17.

A height $H_{v-m}$ from the lowest point 30a to the highest point 31a is in the range of 0.01 mm or more and 1 mm or less. When the height $H_{v-m}$ is less than 0.01 mm, the air in between the wet film 17 and the web guiding roller 18 cannot be released, and thereby the roller 18 tends to slip with respect to the wet film 17. When the height $H_{v-m}$ is more than 1 mm, on the other hand, the lathing processing becomes difficult, and the production cost becomes extremely high even if the lathing is performed.

A curvature radius $R_v$ of the concave portion 30, which is the distance from a center point $O_v$ of a circle forming a cross section of the concave portion 30 to the lowest point 30a, and a curvature radius $R_m$ of the convex portion 31, which is the distance from a center point $O_m$ of a circle forming a cross section of the convex portion 31 to the highest point 31a are in the range of 0.1 mm or more and 0.5 mm or less. When the curvature radii $R_v$ and $R_m$ are less than 0.1 mm, a contact area of the web conveying roller 18 to the wet film 17 becomes so small that the roller 18 may slip with respect to the wet film 17. When the curvature radii $R_v$ and $R_m$ are more than 0.5 mm, on the other hand, the height $H_{v-m}$ becomes so small that the roller 18 may slip with respect to the wet film 17.

Figure 4:
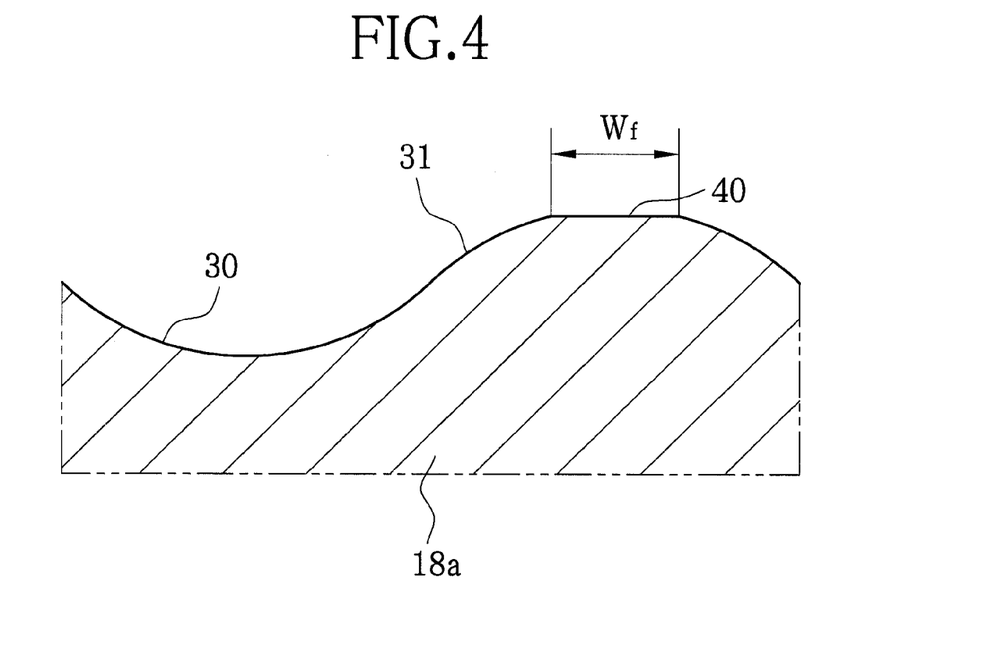
FIG. 4 is a further enlarged partial section view illustrating the surface shape of the web guiding roller.

As shown in FIG. 4 illustrating the enlarged concave portion 30 and convex portion 31, a flat surface 40 is formed at the highest point 31a of the convex portion 31. The flat surface 40 that is parallel to the axial direction of the roller body 18a is formed by, for example, grinding the highest point 31a of the convex portion 31 with use of a grinder, after the formation of the concave portions 30 and the convex portions 31. A width $W_f$ of the flat surface 40 in the axial direction is 0.05 mm or more and 0.5 mm or less. When the width $W_f$ is less than 0.05 mm, some highest portions 31a cannot be grinded depending on the processing accuracy of the convex portions 31. When the width $W_f$ is more than 0.5 mm, on the other hand, the concave portions 30 and the convex portions 31 cannot be formed at the above-described pitches.

Next, an operation of the web conveying apparatus 20 having the above-described configuration is explained. The web 11 is fed from the web roll 10 by the web feeding section 12 and conveyed to the coating section 13. In the coating section 13, the functional material is coated on the surface of the web 10 to be the wet film 17. The wet film 17 is then conveyed toward the web guiding rollers 18.

The wet film 17 is then conveyed by the web guiding rollers 18 to the drying section 14. In the drying section 14, the wet film 17 is dried to be the film 15. The film 15 is then wound up into a roll form in the winding section 16. The film 15 in a roll form is transferred to a following processing step and processed to be an end product.

As explained above, the concave portions 30 and the convex portions 31 having a substantially semicircular cross section are formed alternately on the peripheral surface along the circumferential direction of each web guiding roller 18. The pitch $P_v$ of the concave portions 30 and the pitch $P_m$ of the convex portions 31 are in the range of 0.01 mm or more and 2 mm or less, the height $H_{v-m}$ from the lowest point 30a of the concave portion 30 to the highest point 31a of the convex portion 31 is in the range of 0.01 mm or more and 1 mm or less. The wet film 17 is conveyed by the web guiding rollers 18 having such configuration, therefore the air in between the wet film 17 and the web guiding rollers 18 can efficiently be released. Owing to this, the web guiding rollers 18 contact the wet film 17 with such a frictional force that the rollers 18 do not slip with respect to the wet film 17. Accordingly, the occurrence of scratches and wrinkles are prevented. In addition, the roller marks by the concave portions 30 and the convex portions 31 do not remain on the wet film 17.

Since the flat surface 40 is formed at each highest point 31a of the convex portions 31 with the width $W_f$ in the axial direction of 0.05 mm or more and 0.5 mm or less, the frictional force can be further enhanced, and streak pattern by the flat surface 40 do not remain on the wet film 17.

Note that the pitches $P_v$ and $P_m$ are more preferably 0.3 mm or more and 0.5 mm or less. In addition, the height $H_{v-m}$ is more preferably 0.02 mm or more and 0.1 mm or less.

The curvature radii $R_v$ and $R_m$ are more preferably 0.2 mm or more and 0.4 mm or less. The width $W_f$ is more preferably 0.1 mm or more and 0.3 mm or less. The width of the web 11 is more preferably 1000 mm or more and 2500 mm or less. According to the above-described more preferable ranges, the web guiding roller having enough frictional force to the web and preventing the occurrence of roller marks can be obtained.

In the above embodiment, the web guiding roller 18 is a drive roller driven and rotated by the motor 19. However, the present invention is not limited to this. The web guiding roller 18 may be a free-rotating guiding roller having no drive source.

The web guiding rollers 18 can be used in solution casting apparatuses and melt extrusion apparatuses. In the solution casting method, the web guided by the web guiding rollers 18 may be a wet film peeled from a casting support and a dried film. The wet film contains a solvent. In the solution casting apparatus, a dope including a polymer and the solvent is cast on the casting support to form a casting film thereon, and the casting film is peeled as the wet film from the casting support. Since the peeled wet film contains the solvent, the solvent is evaporated to dry the film. The dried film is wound into a roll form by a winding device or sent to a following step. The following step may be performed in, for example, the web conveying apparatus 20 shown in FIG. 1. In the melt extrusion method, the web guided by the web guiding rollers 18 may be a film that is formed by melting a polymer as a raw material to extrude it in a thin film form by a melt-extrusion device.

In the solution casting method, the wet film contains the solvent and is heated to enhance the drying thereof. In the melt extrusion method, the temperature of the film at the extrusion is as high as the melting point thereof. When the web guiding rollers 18 of the present invention are used for conveying the web containing the solvent or the hot web, the rollers do not slip with respect to the web. Therefore, scratches, wrinkles and roller marks are not generated on the web. Hereinafter, a solution casting apparatus is explained as an example for using the web guiding rollers 18 in a film production apparatus.

[Materials]

As the raw material of the dope, the polymer and the solvent known for being used in the film production by the solution casting method can be used. Among such polymers, cellulose acylate and cyclic polyolefin are preferably used. The configuration of the film production apparatus and the film production method are basically same whichever polymer is used. In this embodiment, cellulose acylate is used as the polymer.

As for cellulose acylate, it is preferable that the degree of hydrogen groups of cellulose esterified for carboxylic acids, that is, the degree of acylation preferably satisfies all of the following formulae (I)-(III).

$$2.5 \leq A+B \leq 3.0 \quad (I)$$

$$0 \leq A \leq 3.0 \quad (II)$$

$$0 \leq B \leq 2.9 \quad (III)$$

In these formulae (I)-(III), A is the degree of substitution of acetyl groups for the hydrogen atoms on the hydroxyl groups of cellulose, and B is the degree of substitution of acyl groups for the hydrogen atoms while each acyl group has carbon atoms whose number is from 3 to 22.

A glucose unit constructing cellulose with β-1,4 bond has free hydroxyl groups at $2^{nd}$, $3^{rd}$ and $6^{th}$ positions. Cellulose acylate is polymer in which, by esterification, the hydrogen atoms on part or all of the hydroxyl groups are substituted by the acyl groups having 2 or more carbon atoms. When the esterification of one hydroxyl group in the glucose unit is made at 100%, the degree of substitution is 1. As for cellulose acylate, when the esterification in each hydroxyl group at the $2^{nd}$, $3^{rd}$ and $6^{th}$ position is made at 100%, the degree of substitution is 3.

Herein, the degree of acylation at the $2^{nd}$ position in the glucose unit is described as DS2, the degree of acylation at the $3^{rd}$ position in the glucose unit is described as DS3, and the degree of acylation at the $6^{th}$ position in the glucose unit is described as DS6. The sum of the degree of acylation, DS2+DS3+DS6, is preferably in the range of 2.00 to 3.00, more preferably in the range of 2.22 to 2.90, and especially preferably in the range of 2.40 to 2.88. Moreover, DS6/(DS2+DS3+DS6) is preferably at least 0.28, more preferably at least 0.30, and especially preferably in the range of 0.31 to 0.34.

In the present invention, cellulose acylate may be composed of either one kind of the acyl group, or two or more kinds thereof. It is preferred, when two or more kinds of the acyl groups are used, that one of them is the acetyl group. When the sum of the degree of substitution of the acetyl groups for the hydroxyl groups at the $2^{nd}$, $3^{rd}$, and $6^{th}$ positions is represented by DSA, and the sum of the degree of substitution of the acyl groups other than the acetyl groups for the hydroxyl groups at the $2^{nd}$, $3^{rd}$, and $6^{th}$ positions is represented by DSB, the value of DSA+DSB is preferably in the range of 2.22 to 2.90, and more preferably in the range of 2.40 to 2.88. DSB is preferably not less than 0.30, and more preferably not less than 0.70. Additionally, it is preferred that the substitution groups at the $6^{th}$ position account for not less than 20% of DSB, and more preferably not less than 25%, and further more preferably not less than 30%, and especially preferably not less than 33%. The value of DSA+DSB at the $6^{th}$ position of cellulose acylate is preferably not less than 0.75, and more preferably not less than 0.80, and especially preferably not less than 0.85. Cellulose acylate with such a composition provides excellent solubility in the dope, and the obtained dope will become low in viscosity and excellent in filterability. Particularly, if a non-chlorine organic solvent is used together, cellulose acylate having the above-described composition is preferable.

The acyl group with 2 or more carbon atoms in cellulose acylate is not limited particularly, and may be either an aliphatic group or an aryl group. Such acyl group may be, for example, alkylcarbonyl ester of cellulose, alkenylcarbonyl ester of cellulose, aromatic carbonyl ester of cellulose, and aromatic alkylcarbonyl ester of cellulose, and each of them may have further substitutents. Exemplary substitutents are a propionyl group, a butanoyl group, a pentanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a t-butanoyl group, a cyclohexane carbonyl group, an oleoyl group, a benzoyl group, a naphthyl carbonyl group, and a cinnamoyl group. Preferable among these are the propionyl group, the butanoyl group, the dodecanoyl group, the octadecanoyl group, the t-butanoyl group, the oleoyl group, the benzoyl group, the naphthyl carbonyl group, and the cinnamoyl group, and more preferable are the propionyl group and the butanoyl group.

Cellulose acylate is explained in detail in Japanese Patent Laid-open Publication No. 2005-104148, paragraph [0140] through [0195], and these descriptions may be applied to the present invention.

The solvent for the dope may be aromatic hydrocarbon (for example, benzene, toluene and the like), halogenated hydrocarbon (for example, dichloromethane, chloroform, chlorobenzene and the like), alcohol (for example, methanol, ethanol, n-propanol, n-butanol, diethylene glycol and the like), ketone (for example, acetone, methyl ethyl ketone and the like), ester (for example, methyl acetate, ethyl acetate, propyl acetate and the like), ether (for example, tetrahydrofuran, methyl cellosolve and the like) and the like. Note that the dope is a polymer solution made by dissolving the polymer into the solvent or a dispersed solution made by dispersing the polymer into the solvent.

The above halogenated hydrocarbon preferably has 1 to 7 carbon atoms, and highly preferred of such halogenated hydrocarbon is dichloromethane. In view of the solubility of cellulose acylate, the peeling condition of the casting film from the support, and the properties of the film product such as mechanical strength and optical character, one or more kinds of alcohol having 1 to 5 carbon atoms may preferably be mixed with dichloromethane. A preferred content of the alcohol to the entire solvent is in the range of 2 wt. % to 25 wt. %, and more preferably in the range of 5 wt. % to 20 wt. %. There are methanol, ethanol, n-propanol, isopropanol, n-butanol, and the like as preferable examples of the alcohol. Among them, methanol, ethanol, n-butanol, and a mixture thereof are preferably used.

In view of the environmental impacts, there is a move to avoid using dichloromethane for the solvent recently. In this case, the solvent may be made of ether having 4 to 12 carbon atoms, ketone having 3 to 12 carbon atoms, ester having 3 to 12 carbon atoms, or a mixture thereof. The above ether, ketone, and ester could have a cyclic structure. Also, the solvent can be made of a compound having two or more functional groups (i.e., —O—, —CO—, and —COO—) in ether, ketone, and ester. The solvent may have other functional groups such as an alcoholic hydroxyl group in the chemical structure.

Various known additives such as a plasticizer, an ultraviolet ray absorber (UV agent), a deterioration inhibitor, a matting agent, a release improver and the like may be added to the dope in accordance with purposes. For example, known plasticizers such as phosphoester type plasticizers, phathalate ester type plasticizers and the like are used. The phosphoester type plasticizers are triphenylphosphate, biphenyl diphenyl phosphate and the like. The phathalate ester type plasticizers are diethylphthalate and the like.

Such additives as solvents, plasticizers, deterioration inhibitors, ultraviolet ray absorbers, retardation (optical anisotropy) controllers, dyestuffs, matting agents, releasing agents, and release improvers are also explained in detail in the Publication No. 2005-104148, paragraph [0196] through [0516], and these descriptions can be applied to the present invention.

With use of the above-described materials, the dope with the cellulose acylate concentration in the range of 5 wt. % to 40 wt. % is produced. The cellulose acylate concentration of the dope is more preferably of 15 wt. % or more and 30 wt. % or less, and especially preferably of 17 wt % or more and 25 wt. % or less. The concentration of the additives to the total solid content is preferably 1 wt. % or more and 20 wt. % or less.

As to the dope production, the dissolution method of the raw materials, the filtering method, the bubble removing method, and the adding method are disclosed in detail in [0517] to [0616] in the Publication No. 2005-104148, and the descriptions thereof can be applied to the present invention.

[Film Production]

A solution casting apparatus 50 is explained with reference to FIG. 5. However, the present invention is not restricted to the solution casting apparatus 50. The solution casting apparatus 50 includes a casting chamber 53, a first drying chamber 56, a tenter 57, an edge slitting device 58, a second drying chamber 61, a cooling chamber 62, a neutralization device 63, a knurling roller pair 66, and a winding section 67. In the casting chamber 53, a dope 51 in which cellulose acylate is dissolved into the solvent is cast to form a wet film 52. The wet film 52 contains the solvent. In the first drying chamber 56, the wet film 52 is dried while being conveyed. In the tenter 57, the wet film 52 fed out from the first drying chamber 56 is held at both side edges. Under such condition, the wet film 52 is dried while being conveyed. The edge slitting device 58 cut off both side edges of the wet film 52. In the second drying chamber 61, the wet film 52 is dried while being conveyed to form a cellulose acylate film (hereinafter, film) 59. The film 59 hardly contains the solvent. In the cooling chamber 62, the film 59 is cooled. The neutralization device 63 decreases charged voltage of the film 59. The knurling roller pair 66 makes the embossing to both side edge portions of the film 59. In the winding section 67, the film 59 is wound.

In the casting chamber 53, a casting die 71 for casting the dope 51, and a belt 72 as a casting support are provided. The casting die 71 is preferably a coat hunger type. In order to maintain the temperature of the dope 51 at a predetermined value, the casting die 71 is provided with a temperature controller (not shown).

The casting die 71 is not limited in width particularly. In this embodiment, the width of the casting die 71 is 1.1 to 2.0 times as wide as the width of the film 59 as the final product. Also preferably, the casting die 71 is provided with a plurality of thickness adjustment bolts (heat bolts) at certain intervals along the width direction of the casting die 71. The heat bolts adjust slit clearance of the die lip.

The belt 72 is bridged across back-up rollers 73 that rotate in the circumferential direction thereof. The belt 72 continuously runs in accordance with the rotation of the back-up roller 73. The back-up rollers 73 are provided with a drive unit (not shown) and rotate owing to the drive unit. The belt 72 is not limited in width particularly. In this embodiment, the width of the belt 72 is 1.1 to 2.0 times as wide as the casting width of the dope 51. The belt 72 is finished with the chrome plating and has a surface roughness of 0.01 μm or less.

Provided inside the back-up rollers 73 is a passage for a heat transfer medium (not shown). The back-up rollers 73 are connected to a heat transfer medium circulator (not shown) for controlling the temperature of the heat transfer medium and supplying the heat transfer medium to the passage. Owing to this, the surface temperature of each back-up roller 73 is controlled, and thereby making the temperature of the belt 72 to be a predetermined value. The temperature of the belt 72 is appropriately set in accordance with types of the solvent and the solid content, the concentration of the dope 51, and the like.

A casting bead, which is a ribbon-shaped portion of the cast dope 51, is formed between the casting die 71 and the belt 72. A casting film 78 is formed on the belt 72. A decompression chamber 76 is disposed on an upstream side of the casting bead in the belt's moving direction. The decompression chamber 76 stabilizes the formation of the casting bead by controlling the pressure in the upstream side of the bead.

Preferably, an upstream area from the casting bead is decompressed within the range of −2000 Pa to −10 Pa relative to a downstream area from the casting bead. In addition, it is preferable to attach a suction unit (not shown) to an edge of the casting die 71 and suction both sides of the bead in order to keep the shape of the casting bead to be a desired shape. A preferable range of air volume aspirated in the edge portion is 1 L/min to 100 L/min.

The casting chamber 53 is provided with a temperature controller 77 for controlling the internal temperature of the casting chamber 53 to a predetermined value, and a condenser (not shown) for condensing the solvent evaporated from the dope 51 and the casting film 78. Outside the casting chamber 53 is provided a recovery device (not shown) for recovering the condensed and liquefied solvent. The solvent recovered by the recovering device is reused as the solvent for the dope production.

A peel roller 85 for supporting the wet film 52 to peel the casting film 78 from the belt 72 is provided in the casting chamber 53. The casting film 78 is dried until it comes to have a self-supporting property. When having the self-supporting property, the casting film 78 is peeled from the belt 72. At the time of peeling, the weight of the remaining solvent in the casting film 78 is preferably in the range of 10 to 200 when the weight of the solid content is 100.

Instead of the belt 72 and the back-up rollers 73, a drum that rotates in the circumferential direction thereof may be used. When the drum is used, the casting film 78 is cooled to be gelated, and thereby the self-supporting property of the casting film 78 is developed. When the casting film 78 is dried while being cooled, the time taken before the peeing can be shortened.

The first drying chamber 56 is provided with an air blower (not shown). The temperature from the air blower is preferably in the range of 20° C. to 250° C. In the first drying chamber 56, the web guiding rollers 18 are provided for guiding the wet film 52 to the tenter 57. Even though the wet film 52 contains the solvent or the temperature of the wet film 52 is as high as, for example, 100° C. or more owing to the air blower, the web guiding rollers 18 can stably convey the wet film 52 without slipping. Therefore, occurrence of scratches and wrinkles on the wet film 52 is prevented. In addition, foreign matters will not be pressed against the wet film 52 by the web guiding rollers 18, and therefore a surface of the wet film 52 will not be distorted by the web guiding rollers 18. Moreover, occurrence of roller marks is prevented by using the web guiding rollers 18.

Note that all or some of the rollers provided along the passage in the first drying chamber 56 can be the web guiding rollers 18 of the present invention. Among the rollers provided in the first drying chamber 56, the drive rollers are preferably the web guiding rollers 18. It is more preferable that the free-rotating rollers therein are also the web guiding rollers 18.

In the first drying chamber 56, draw tension that is a tension in the film conveying direction can be applied to the wet film 52. The draw tension is applied by making a rotation speed of the downstream roller faster than a rotation speed of the upstream roller. Owing to this, the wet film 52 is prevented from sagging or being deformed.

In the tenter 57, both side edges of the wet film 52 are held with holding members (not shown). The wet film 52 is conveyed in accordance with the movement of the holding members. The wet film 52 is dried while being conveyed. Clips that hold the side edges of the wet film 52, pins that are penetrated through the side edges of the wet film 52 to hold it, and the like are used as the holding members. When the belt 72 is used as the casting support and the casting film 78 is peeled after evaporating part of the solvent from the casting film 78, the clips are preferably used as the holding members in the tenter 57. On the other hand, when the drum is used as the casting support and the casting film is peeled after being cooled without practically evaporating the solvent therefrom, the pins are preferably used as the holding members in the tenter 57. In the tenter 57, the temperate of the wet film 52 is regulated to be 120° C. or more and 180° C. or less, thereby the drying of the wet film 52 is proceeded.

After being dried in the tenter 57, both side edges of the wet film 52 are cut off by the edge slitting device 58. The cut edges are sent to a crusher 89 by a cutter blower (not shown) and shredded into chips by the crusher 89. The chips are recycled for preparing the dope.

The wet film 52 whose side edges have been cut off is sent to the second drying chamber 61. In the second drying chamber 61, the wet film 52 is further dried while being conveyed. The internal temperature of the second drying chamber 61 is not particularly limited, but may preferably in the range of 60° C. to 140° C. The passage in the second drying chamber 61 is also provided with the web guiding rollers 18, like the first drying chamber 56. Even though the temperature of the wet film 52 is as high as, for example, 100° C. or more, the web guiding rollers 18 can stably convey the wet film 52 without slipping. Therefore, occurrence of scratches and wrinkles on the wet film 52 is prevented. In addition, foreign matters will not be pressed against the wet film 52 by the web guiding rollers 18, and therefore the surface of the wet film 52 will not be distorted by the web guiding rollers 18. Moreover, occurrence of roller marks is prevented by using the web guiding rollers 18.

Note that all or some of the rollers provided along the passage in the second drying chamber 61 can be the web guiding rollers 18 of the present invention. Among the rollers provided in the second drying chamber 61, the drive rollers are preferably the web guiding rollers 18. It is more preferable that the free-rotating rollers therein are also the web guiding rollers 18.

The dried film 59 is preferably cooled to approximately room temperature in the cooling chamber 62.

The neutralization device 63 is a so-called compulsory neutralization device such as a neutralization bar. The neutralization device 63 preferably controls the charged voltage of the film 59 to be within the range of −3 kV to +3 kV. The position of the neutralization device 63 is not limited to the downstream side of the cooling chamber 62.

The knurling roller pair 66 provides the film 59 with knurling by making the embossing to both side edge portions of the film 59. When the knurling is provided to the film 59, the height of each of projections and depressions of the knurling is preferably in the range of 1 μm to 200 μm.

Inside the winding section 67 is provided a winding device 92 for winding the film 59 and a press roller 93 for controlling the tension of the film 59 at the time of winding.

Some rollers provided along the film passage in the solution casting apparatus 50 are not shown in the drawing, and the web guiding rollers of the present invention can be used as such rollers. With use of the web guiding rollers of the prevent invention, the wet film 52 and the film 59 can be more stably conveyed as compared to the usage of conventional rollers. In addition, the occurrence of scratches and wrinkles on the film 59 is prevented, and roller marks will not be generated on the film 59. Both the drive rollers and the free-rotating rollers have conventionally been used as the rollers provided along the passage. When the web guiding rollers of the present invention are used as the drive rollers instead of the conventional drive rollers, the above-described effects can be obtained particularly well.

The present invention is particularly effective when the width of the wound film 59 is 600 mm or more. In this embodiment, the width of the wound film 59 is in the range of 1400 mm to 2500 mm. It is to be noted that the present invention is effective for the manufacture of wide films with width of more than 2500 mm. Additionally, the present invention is particularly effective for the manufacture of films with thickness of 20 μm ore more and 80 μm or less.

EXAMPLE 1

Experiment 1

In order to clarify the effect of the web guiding roller of the present invention, Experiment 1 was performed under the following conditions. In Experiment 1, the roller body 18a of each web guiding roller 18 was made of stainless steel (without plating) and had a diameter of 300 mm and a length of 1000 mm in a longitudinal direction. The shafts 18b were fixedly fitted to the opposite ends of the roller body 18a. The concave portions 30 and the convex portions 31 were formed on the roller body 18a such that the pitches $P_v$ and $P_m$ were 0.5 mm, the height $H_{v-m}$ was 0.04 mm, and the curvature radii $R_v$ and $R_m$ were 0.4 mm.

The web 11 was made from triacetylcellulose and had a thickness of 80 μm. The web 11 was conveyed at a tension of 200 N/m and a wrap angle of 90°. Under such conditions, the frictional force of the web guiding rollers 18 with respect to the web 11 being conveyed at a speed of 20 m/min to 60 m/min was measured.

Experiments 2 to 8

Instead of the web guiding rollers 18 used in Experiment 1, the web guiding rollers 18 with the concave portions 30 and the convex portions 31 whose pitches "$P_v$" and "$P_m$", and height "$H_{v-m}$" were as shown in Table 1 were prepared for Experiments 2 to 8. As to whether the web guiding rollers 18 slipped with respect to the web 11 or not and whether roller marks by the rollers 18 were generated on the web 11 or not were evaluated in each of Experiments 1 to 8. When rollers 18 did not slip with respect to the web 11, and there were no scratches or wrinkles generated on the web 11, the rollers 18 were evaluated as "Good". When rollers 18 slightly slipped with respect to the web 11, but there were practically no scratches or wrinkles generated on the web 11, the rollers 18 were evaluated as "Average". When rollers 18 slipped with respect to the web 11, and there were scratches or wrinkles generated on the web 11, the rollers 18 were evaluated as "Poor". The evaluation results are shown at a section of "SLIP" in Table 1. Moreover, when there were no roller marks generated on the web 11, the rollers 18 were evaluated as "Good". When there were some roller marks generated on the web 11, but they were practically negligible, the rollers 18 were evaluated as "Average". When there were roller marks generated on the web 11, the rollers 18 were evaluated as "Poor". The evaluation results are shown at a section of "ROLLER MARKS" in Table 1.

Comparative Experiment 1

Figure 6:
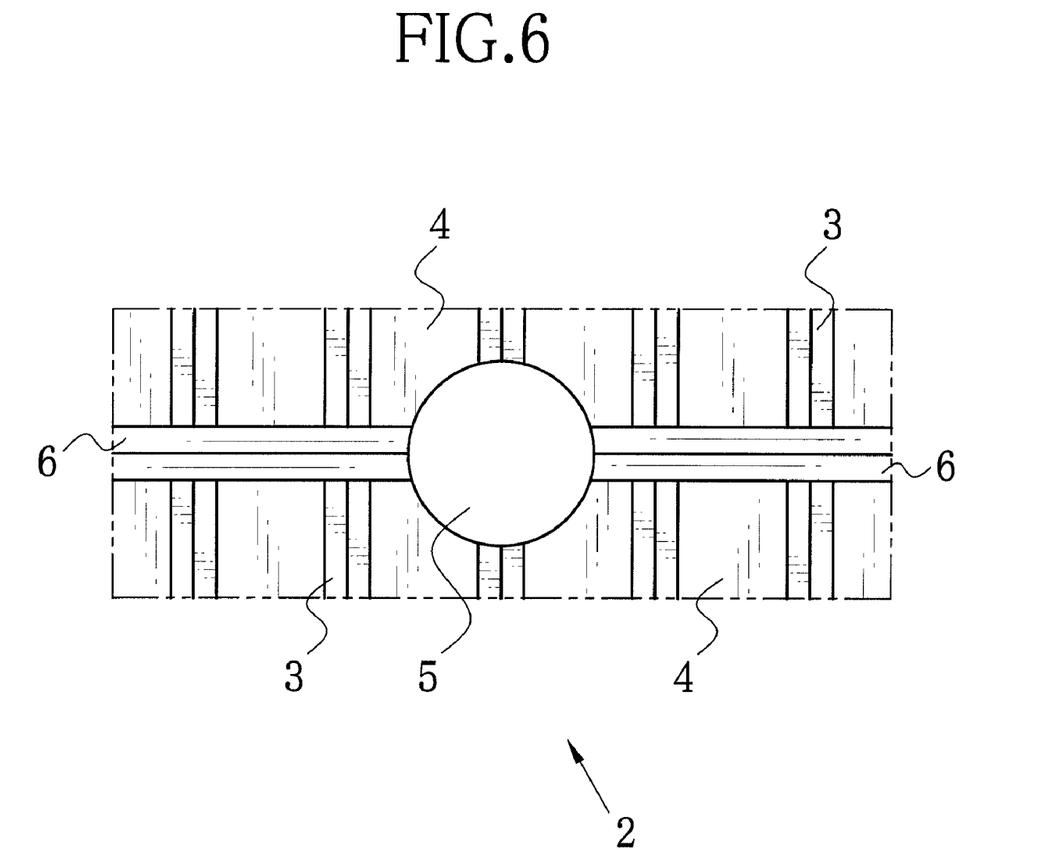
FIG. 6 is an explanatory view illustrating a shape of a suction roller as Comparative Example.

In comparison to the present invention, Comparative Experiment 1 was performed. In Comparative Experiment 1, suction rollers 2 having the following configuration were prepared. A roller body of each suction roller 2 was made of stainless steel (without plating) and had a diameter of 300 mm and a length of 1000 mm in a longitudinal direction. Shafts were fixedly fitted to opposite ends of the roller body. As shown in FIG. 6, substantially V-form grooves 3 were formed along a circumferential direction of the roller body with a pitch of 2 mm, a height of 0.5 mm, and a width of 1 mm. These grooves 3 were referred to as vertical grooves. The roller body had flat surfaces 4 with a width of 1 mm and a curvature radius of 0.2 mm at the boundary to the vertical grooves 3. Suction holes 5 having a diameter of 3 mm were also formed on the roller body. Substantially V-form grooves 6 were formed along an axial direction of the roller body such that the grooves 6 extend from the center of each suction hole 5. These grooves 6 were referred to as horizontal grooves. The horizontal grooves 6 had a width of 1 mm and a height of 0.5 mm.

Comparative Experiment 1 was performed under the conditions same as Experiment 1 except that the suction rollers 2 were used instead of the web guiding rollers 18. Under such conditions, the frictional force of the suction rollers 2 with respect to the web 11 was measured.

In Experiment 1, the frictional force of the web guiding rollers 18 was 150 N to 300 N in the above-described conveying speed range, and the web guiding rollers 18 did not slip with respect to the web 11. In addition, the roller marks by the concave and convex portions 30 and 31 were not generated on the web 11. In Comparative Experiment 1, on the other hand, the frictional force of the suction rollers 2 was about 100 N in the above-described conveying speed range, which was inferior to the result of Experiment 1. This showed that the web guiding roller 18 of the present invention had excellent properties such as not slipping with respect to the web 11, preventing the occurrence of scratches, wrinkles and roller marks on the web 11. The suction roller 2 of Comparative Experiment 1 needs a device for suctioning air, which causes additional costs. In view of this, the web guiding roller 18 of the present invention is superior on the cost front as well.

Comparative Experiments 2 to 5

Instead of the web guiding rollers 18 used in Experiment 1, web guiding rollers with concave portions and convex portions whose pitches "$P_v$" and "$P_m$", and height "$H_{v-m}$" were as shown in Table 1 were prepared for Comparative Experiments 2 to 5. Like Experiments 1 to 8, as to whether the web guiding rollers slipped with respect to the web 11 or not and whether roller marks by the rollers were generated on the web 11 or not were evaluated in each of Comparative Experiments 2 to 5. The evaluation results are shown in Table 1.

TABLE 1

|  | $P_v$ (mm) | $P_m$ (mm) | $H_{v-m}$ (mm) | SLIP | ROLLER MARKS |
|---|---|---|---|---|---|
| EX. 1 | 0.5 | 0.5 | 0.04 | Good | Good |
| EX. 2 | 1 | 1 | 0.04 | Good | Average |
| EX. 3 | 0.3 | 0.3 | 0.04 | Good | Good |
| EX. 4 | 0.2 | 0.2 | 0.04 | Average | Good |
| EX. 5 | 0.5 | 0.5 | 0.1 | Good | Good |
| EX. 6 | 0.5 | 0.5 | 0.5 | Average | Good |
| EX. 7 | 0.5 | 0.5 | 0.02 | Good | Good |
| EX. 8 | 0.5 | 0.5 | 0.015 | Average | Good |
| COM. EX. 2 | 3 | 3 | 0.04 | Good | Poor |
| COM. EX. 3 | 0.005 | 0.005 | 0.04 | Poor | Good |
| COM. EX. 4 | 0.5 | 0.5 | 1.5 | Poor | Good |
| COM. EX. 5 | 0.5 | 0.5 | 0.005 | Poor | Good |

EXAMPLE 2

A dope 51 having the following composition was prepared.

| | |
|---|---|
| Cellulose triacetate (acetylation degree: 60.7%) | 100 pts. wt |
| Plasticizer A (triphenylphosphate) | 8 pts. wt |
| Plasticizer B (phthalate ester) | 4 pts. wt |
| Matting agent | 0.03 pts. wt |
| Solvent component 1 (dichloromethane) | 594 pts. wt |
| Solvent component 2 (methanol) | 66 pts. wt |

Figure 5:
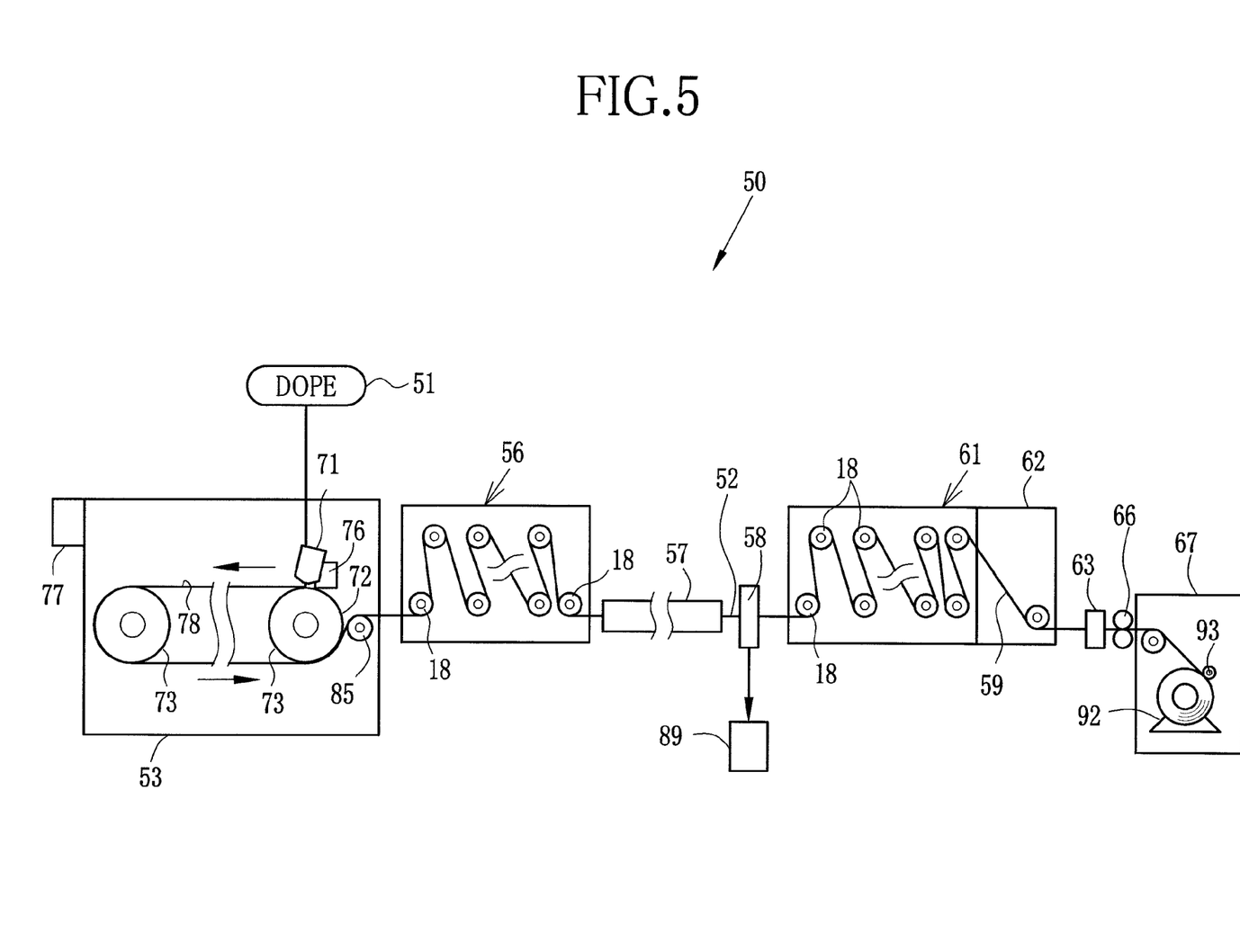
FIG. 5 is a solution casting apparatus including the web guiding rollers.

Experiments 1 to 4 were performed using the solution casting apparatus 50 shown in FIG. 5. The temperature of the wet film 52 in the second drying chamber 61 of the solution casting apparatus 50 was changed in each Experiment 1 to 4. In the second drying chamber 61, the roller at most upstream side was referred to as a first drive roller, and the roller at most downstream side was referred to as a second drive roller. Other rollers disposed between the first and second drive rollers along the passage were free-rotating rollers. The first and second drive rollers were the web guiding rollers 18 of the present invention. The rotation speed of the second drive roller was made faster than the rotation speed of the first drive roller, thereby the tension of the wet film 52 between the first and second drive rollers was regulated to 10 N in its conveyed direction as shown at a section of "TENSION" in Table 2. The value of the tension was obtained per meter in the width direction of the wet film 52. The conveying speed of the wet film 52 was regulated to 10 m/min as shown at a section of "CONVEYING SPEED" in Table 2. Note that all the drive rollers disposed on the passage besides the second drying chamber 61 were the web guiding rollers 18 of the present invention. The obtained films 59 were evaluated as to whether there were scratches, wrinkles, or roller marks. The evaluation was made by visually checking the films 59. When there were no scratches, wrinkles, or roller marks recognized, the film 59 was evaluated as "Good". When there were scratches, wrinkles, or roller marks recognized, the film 59 was evaluated as "Poor". The evaluation results are shown at a section of "EVALUATION" in Table 2.

Comparative Experiments 1 to 4 were performed using the suction rollers 2 in the second drying chamber 61 instead of the web guiding rollers 18. Note that all the drive rollers disposed on the passage besides the second drying chamber 61 were the web guiding rollers 18 of the present invention. Other conditions and the evaluating method were same as Experiments 1 to 4. The results are shown in Table 2.

TABLE 2

|  | TEMPERATURE (° C.) | TENSION (N) | CONVEYING SPEED (m/min) | EVALUATION |
|---|---|---|---|---|
| EX. 1 | 30 | 10 | 10 | Good |
| COM. EX. 1 |  |  |  | Poor |
| EX. 2 | 50 |  |  | Good |
| COM. EX. 2 |  |  |  | Poor |
| EX. 3 | 100 |  |  | Good |
| COM. EX. 3 |  |  |  | Poor |
| EX. 4 | 150 |  |  | Good |
| COM. EX. 4 |  |  |  | Poor |

EXAMPLE 3

Experiments 1 to 3 were performed under the same conditions as Example 2 except that the temperature of the wet film 52 in the second drying chamber 61 was regulated to 100° C., and the tension of the wet film 52 was changed in each Experiment 1 to 3. The evaluating method was same as Example 2. The results are shown in Table 3.

Comparative Experiments 1 to 3 were performed using the suction rollers 2 in the second drying chamber 61 instead of the web guiding rollers 18. Other conditions were same as Experiments 1 to 3. The results are shown in Table 3.

TABLE 3

|  | TEMPERATURE (° C.) | TENSION (N) | CONVEYING SPEED (m/min) | EVALUATION |
|---|---|---|---|---|
| EX. 1 | 100 | 5 | 10 | Good |
| COM. EX. 1 |  |  |  | Poor |
| EX. 2 |  | 10 |  | Good |
| COM. EX. 2 |  |  |  | Poor |
| EX. 3 |  | 20 |  | Good |
| COM. EX. 3 |  |  |  | Poor |

EXAMPLE 4

Experiments 1 to 3 were performed under the same conditions as Example 2 except that the temperature of the wet film 52 in the second drying chamber 61 was regulated to 100° C., and the conveying speed of the wet film 52 was changed in each Experiment 1 to 3. The evaluating method was same as Example 2. The results are shown in Table 4.

Comparative Experiments 1 to 3 were performed using the suction rollers 2 in the second drying chamber 61 instead of the web guiding rollers 18. Other conditions were same as Experiments 1 to 3. The results are shown in Table 4.

TABLE 4

|  | TEMPERATURE (° C.) | TENSION (N) | CONVEYING SPEED (m/min) | EVALUATION |
|---|---|---|---|---|
| EX. 1 | 100 | 10 | 10 | Good |
| COM. EX. 1 |  |  |  | Poor |
| EX. 2 |  |  | 20 | Good |
| COM. EX. 2 |  |  |  | Poor |

TABLE 4-continued

|  | TEMPERATURE (° C.) | TENSION (N) | CONVEYING SPEED (m/min) | EVALUATION |
|---|---|---|---|---|
| EX. 3 |  |  | 30 | Good |
| COM. EX. 3 |  |  |  | Poor |

EXAMPLE 5

In the first drying chamber 56 of the solution casting apparatus 50, the roller at most upstream side was referred to as a first drive roller, and the roller at most downstream side was referred to as a second drive roller. Other rollers disposed between the first and second drive rollers along the passage were free-rotating rollers. The first and second drive rollers were the web guiding rollers 18 of the present invention. The rotation speed of the second drive roller was made faster than the rotation speed of the first drive roller, thereby the tension of the wet film 52 in its conveyed direction between the first and second rollers was regulated to 100 N per meter in the width direction of the wet film 52. The conveying speed of the wet film 52 was regulated to 10 m/min as shown at a section of "CONVEYING SPEED" in Table 2. Note that all the drive rollers disposed on the passage besides the first drying chamber 56 were the web guiding rollers 18 of the present invention.

The position where the casting film 78 was peeled from the belt 72 was referred to as a first position. An entrance of the first drying chamber 56 was referred to as a second position. An exit of the first drying chamber 56 was referred to as a third position. The temperature of the dope 51, the internal temperature of the casting chamber 53, the temperature of the belt 72, and the temperature of dry air from an air duct disposed near the casting film 78 were respectively controlled such that the rate of solvent content in the wet film 52 at the first and second positions became 150 wt. %. The rate of solvent content was on a dry basis, and calculated by the following formula: $[(X-Y)/Y] \times 100$, where X is the weight of the film at the time of sampling, and Y is the weight of the same after the drying.

Experiments 1 to 3 were performed where the rate of solvent content at the third position, and the temperatures of the wet film 52 at the second and third positions were respectively regulated to the values shown in Table 5. The first drying chamber 56 was provided with an air duct (not shown) for sending air and a ventilation duct (not shown) for exhausting gas inside the chamber 56 to outside thereof. The rate of solvent content of the wet film 52 at the third position and the temperature of the wet film 52 at the third position were controlled by adjusting the humidity and the temperature of the air from the air duct. Other conditions were same as Experiment 3 of Example 2. At a section of "ROLLER" in Table 5, "A" represents the web guiding roller 18 of the present invention. "P1", "P2" and "P3" at sections of "SOLVENT CONTENT" and "TEMPERATURE OF FILM" in Table 5 represent the first position, the second position and the third position, respectively.

The films 59 obtained from Experiments 1 to 3 were evaluated as to whether there were scratches, wrinkles, or roller marks. The evaluation was made by visually checking the films 59. When there were no scratches, wrinkles, or roller marks recognized, the film 59 was evaluated as "Good". When there were scratches, wrinkles, or roller marks recognized, the film 59 was evaluated as "Poor". The evaluation results are shown at a section of "EVALUATION" in Table 5.

In Comparative Experiment 1, the web guiding rollers 18 of the first drying chamber 56 in Experiments 1 to 3 were replaced by flat rollers having a flat peripheral surface. In Comparative Experiment 2, the web guiding rollers 18 of the first drying chamber 56 in Experiments 1 to 3 were replaced by concave rollers whose diameter gradually decreases from an edge toward the center in a longitudinal direction thereof. Note that all the drive rollers disposed on the passage besides the first drying chamber 56 were the web guiding rollers 18 of the present invention. Other conditions and the evaluation method were same as Experiments 1 to 3. At the section of "ROLLER" in Table 5, "B" represents the flat roller and "C" represents the concave roller.

TABLE 5

|  | ROLLER | SOLVENT CONTENT (mass %) | | | TEMPERATURE OF FILM (° C.) | | EVALUATION |
|---|---|---|---|---|---|---|---|
|  |  | P1 | P2 | P3 | P2 | P3 |  |
| EX. 1 | A | 150 | 150 | 60 | 10 | 70 | Good |
| EX. 2 | A | 150 | 150 | 40 | 8 | 70 | Good |
| EX. 3 | A | 150 | 150 | 20 | 10 | 70 | Good |
| COM. EX. 1 | B | 150 | 150 | 60 | 10 | 70 | Poor |
| COM. EX. 2 | C | 150 | 150 | 60 | 10 | 70 | Poor |

In Experiments 1 to 4 of Example 2, Experiments 1 to 3 of Example 3, and Experiments 1 to 3 of Example 4, the web guiding rollers 18 did not slip with respect to the wet film 52 or the film 59. In addition, roller marks of the concave and convex portions 30 and 31 did not remain on the wet film 52 and the film 59. Moreover, the film 59 did not have scratches or wrinkles. In Comparative Experiments of Examples 2 to 4, on the other hand, the rollers tended to slip more as the temperature, the tension of the wet film 52 in its conveyed direction, or the conveying speed of the film rises. As a result, roller marks, scratches and wrinkles were generated on the film.

In the solution casting method, the wet film with a rate of solvent content as high as 150% or more may be conveyed. Even in such case, the web guiding rollers of the present invention stably conveyed the wet film without slipping with respect to the wet film. Moreover, the film obtained from such wet film did not have scratches, wrinkles, or film marks.

According to the above results, it is understood that the web guiding rollers of the present invention are preferably used for conveying the wet film in the film production apparatus and for conveying the produced film.

Various changes and modifications are possible in the present invention and may be understood to be within the present invention.

What is claimed is:

1. A roller for guiding running of a web while supporting said web on a peripheral surface of said roller, said web guiding roller comprising:
concave portions and convex portions alternately formed on said peripheral surface along a circumferential direction of said roller, said concave portions and said convex portions having a substantially semicircular cross section, wherein a pitch between said concave portions and a pitch between said convex portions are in the range of 0.01 mm or more and 2 mm or less, a height from a lowest point of said concave portion to a highest point of said convex portion is in the range of 0.01 mm or more and 1 mm or less, wherein a flat surface parallel to an axial direction of said roller is formed at each said highest point of said convex portion.

2. The web guiding roller according to claim 1, wherein a curvature radius of said concave portion and a curvature radius of said convex portion are in the range of 0.1 mm or more and 0.5 mm or less.

3. The web guiding roller according to claim 2, wherein said flat surface has a width of 0.05 mm or more and 0.5 mm or less in said axial direction.

4. The web guiding roller according to claim 3, wherein a coating is applied to the web to form a layer of at least one of a magnetic coating layer, a photosensitive coating layer, and an optical functional coating layer.

5. The web guiding roller according to claim 4, wherein said web being guided by said roller has a thickness of 20 μm or more and 200 μm or less.

6. A web conveying apparatus including a plurality of web guiding rollers, said web guiding rollers being disposed along a web conveying passage, for conveying a web while supporting said web on peripheral surfaces of said rollers, said web guiding rollers comprising:

concave portions and convex portions alternately formed on said peripheral surfaces along a circumferential direction of said rollers, said concave portions and said convex portions having a substantially semicircular cross section, wherein a pitch between said concave portions and a pitch between said convex portions are in the range of 0.01 mm or more and 2 mm or less, a height from a lowest point of said concave portion to a highest point of said convex portion is in the range of 0.01 mm or more and 1 mm or less, wherein a flat surface parallel to an axial direction of said roller is formed at each said highest point of said convex portion.

7. The web conveying apparatus according to claim 6, wherein said web guiding roller is driven and rotated by a motor.

8. The web conveying apparatus according to claim 6, wherein a pitch between said concave portions and a pitch between said convex portions are in the range of 0.3 mm or more and 0.5 mm or less.

* * * * *